Nov. 24, 1964

J. RYWAK 3,158,757

LONG INTERVAL TIMER CIRCUIT

Filed April 23, 1962

Inventor
JOHN RYWAK

Attorney

Nov. 24, 1964 J. RYWAK 3,158,757
LONG INTERVAL TIMER CIRCUIT
Filed April 23, 1962 2 Sheets-Sheet 2

Inventor
JOHN RYWAK
Attorney

United States Patent Office

3,158,757
Patented Nov. 24, 1964

3,158,757
LONG INTERVAL TIMER CIRCUIT
John Rywak, Bells Corners, Ontario, Canada, assignor to Northern Electric Company, Limited, Montreal, Quebec, Canada, a corporation of Canada
Filed Apr. 23, 1962, Ser. No. 189,348
7 Claims. (Cl. 307—88.5)

This invention relates to timer circuits and more particularly to long interval timer circuits employing transistors.

Time intervals in microsecond and millisecond ranges usually are obtained by conventional monostable circuits. For delays in the seconds ranges, the timing capacitors employed in these circuits would be prohibitively large. For example, a monostable having a delay of 100 microseconds uses a .005 microfarad capacitor. If a delay of 60 seconds is required, a capacitor of 3000 microfarad $$= \left(\frac{60}{100+10^{-6}}\right)(.005)$$

would be required. Capacitors of this large size are usually electrolytic and are more sensitive to temperature variations than capacitors made of such materials as paper or mylar. On the other hand, large capacitors made of such materials as tantalum are able to withstand high temperatures but are expensive.

An object of this invention is to provide a long range timer circuit having capacitative components of a minimum size.

Another object of this invention is to provide a long range timer circuit, having the foregoing properties, with improved temperature variation control.

A still further object of the invention is to provide a long interval timer circuit having the foregoing properties, which is economical to fabricate.

These and other objects of this invention are attained by providing a long interval timing circuit which includes a transistor charging circuit arranged to repeatedly charge a capacitor and then discharge such charge into a larger capacitor. The conditioning pulse, applied to the charging circuit, is derived from a free running transistor two-state multivibrator, the rate at which the conditioning pulse is applied to the conditioning circuit being controlled by a bi-stable, two-state transistor multivibrator.

A better understanding of the invention may be attained by referring to the following description, taken in conjunction with the drawings in which like numbers refer to like parts, in which.

Figure 1:
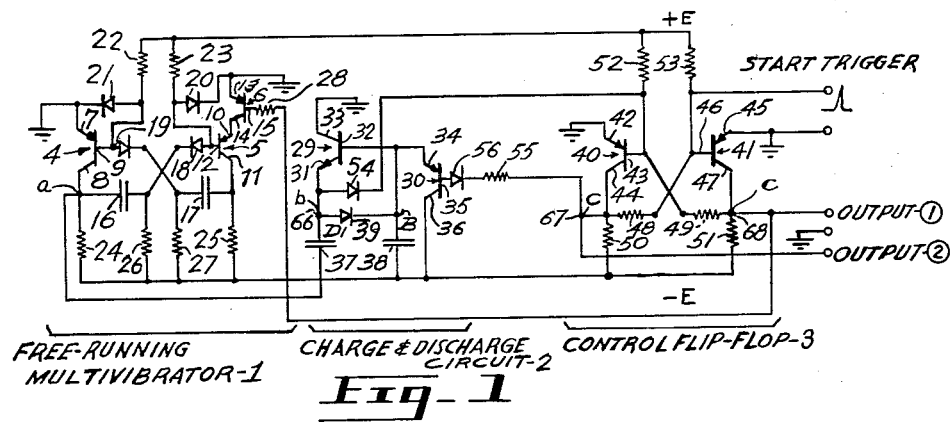
FIG. 1 illustrates a schematic circuit diagram of one embodiment of the timer of the invention.

Considering the drawings, there is shown in FIG. 1, a free running, two-state multivibrator 1, a charging and discharging circuit 2 and a control bi-stable, two-state multivibrator or flip-flop 3. Multivibrator 1 includes transistors 4, 5, 6, each having an emitter, collector and base electrode 7, 8, 9 and 10, 11, 12 and 13, 14, 15 respectively.

Also shown in FIG. 1 are capacitors 16, 17 connected between the collector electrode 8 of transistor 4, through diode 18, to the base electrode 12 of transistor 5 and from the collector electrode 11 of transistor 5, through diode 19 to the base electrode 9 of transistor 4. The emitter electrode 10 of transistor 5 is connected to the collector 14 of transistor 6 while the base electrode 12 of transistor 5 is connected through diode 20 to the emitter 13 of transistor 6. Diode 21 is connected between the emitter electrode 7 of transistor 4 and the diode 19. Elements 22, 23, 24, 25, 26, 27 and 28 are the biasing resistors. Further information respecting this circuit may be obtained by referring to the book entitled "Pulse and Digital Circuits," 1956, by Millman and Taub, page 603.

Considering the charge and discharge circuit 2, there is shown transistors 29, 30 each having an emitter, base and collector electrodes 31, 32, 33 and 34, 35, 36 respectively, with the base electrode 32 being connected to the emitter electrode 34 of transistor 30. The emitter electrode 31 of transistor 29 is connected to collector 8 of transistor 4. Collector 36 of transistor 30 is connected to the negative power source. Capacitor 38 is connected between the emitter and collector electrodes 34, 36 of transistor 30. Diode 39 is connected between the upper plates of capacitors 37, 38.

With respect to the two-state multivibrator or flip-flop 3, there is shown transistor 40, 41 each having an emitter, base and collector electrodes 42, 43, 44 and 45, 46, 47. Also shown are coupling resistors 48, 49, biasing resistors 50, 51, 52, 53. This is a conventional bi-stable multivibrator circuit.

The base electrode 43 of transistor 40 is connected to the emitter electrode 31 of transistor 29 through diode 54, while the collector electrode 44 of transistor 40 is connected to the base electrode 35 through resistor 55 and diode 56. The collector electrode 68 of transistor 41 is connected to the base electrode 15 of transistor 6 through biasing resistor 28.

Figure 2:
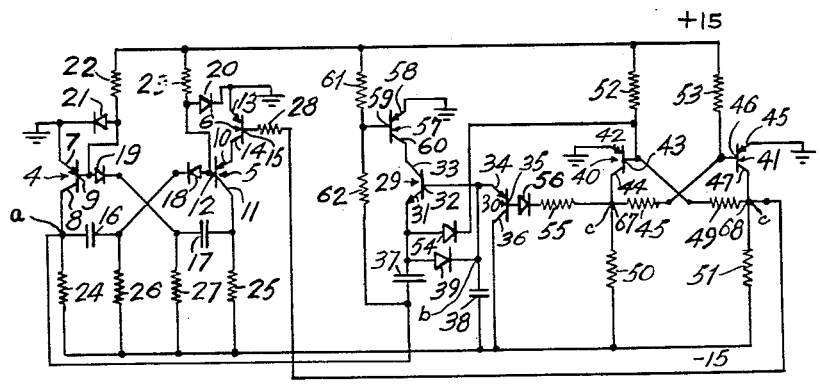
FIG. 2 illustrates a schematic circuit diagram of another embodiment of the timer of the invention having means to reduce leakage currents.
Figure 3:
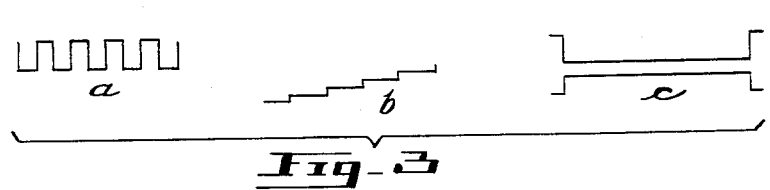
FIG. 3 illustrates the input and output pulses of the timer.

Considering FIG. 2, the circuit illustrated is the same as described with respect to FIG. 1 except that there is shown in addition transistor 57 of opposite conductivity to transistor 29 having emitter, base and collector electrodes 58, 59, 60 with the collector electrode 60 connected to the collector electrode 33 of transistor 29, and the base electrode 59 connected to the voltage divider 61, 62, one extremity of which is connected to the positive power source and the other extremity to collector 8 of transistor 4.

Figure 4:
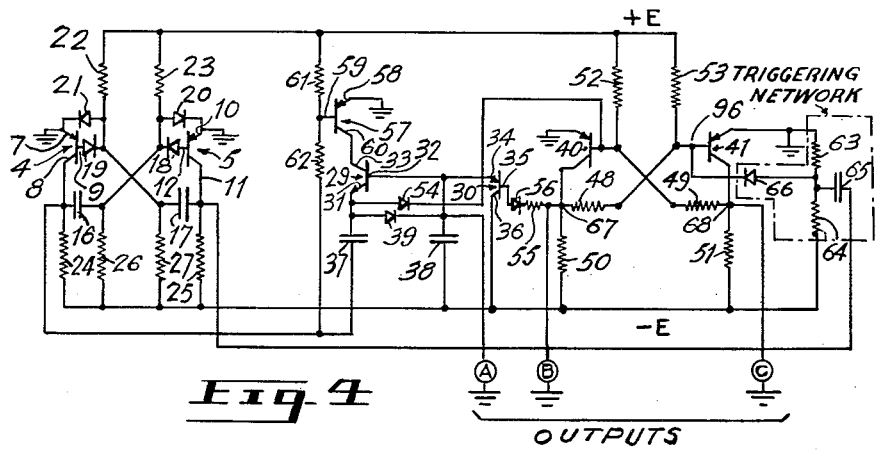
FIG. 4 illustrates a schematic circuit diagram of the timer of the invention in which the free running multivibrator operates continuously and having a triggering network.

In FIG. 4, this circuit is the same as that described for FIG. 2, except that transistor 6 of the multivibrator 1 has been eliminated while a triggering network, consisting of resistors 63, 64, capacitor 65 and diode 66 has been added. 67, 68 are points of reference potential from which outputs may be taken.

Representative values of the circuits elements employed in the timer are:

Resistors:
| | |
|---|---|
| 22 | 220K |
| 23 | 220K |
| 24 | 10K |
| 25 | 10K |
| 26 | 82K |
| 27 | 82K |
| 28 | 22K |
| 50 | 3.3K |
| 51 | 3.3K |
| 52 | 220K |
| 53 | 220K |
| 55 | 10K |
| 48 | 22K |
| 49 | 22K |
| 61 | 1600K |
| 62 | 82K |
| 63 | 27K |
| 64 | 270K |

Capacitors:
| | | |
|---|---|---|
| 37 | mf | .0245 |
| 38 | mf | 42 |
| 65 | mf | .005 |

*Operation of the Circuit*

In general, the capacitor 38 is charged from the capacitor 37 by the charging circuit 2 of which capacitors 38 and 37 are a part. The timing of the charging of the capacitors 38 and 37 is obtained from a square wave pulse derived from the free-running multivibrator circuit 1 in conjunction with the control circuit 3.

Considering FIG. 1, when a negative going pulse, derived from collector 8 of transistor 4 in multivibrator 1, is applied to the charging circuit 2, the circuit (—E)–37–31–33–ground is completed so that capacitor 37 charges, since transistor 29 and diode 39 are conducting and non-conducting respectively. The base current for transistor 29 is provided by capacitor 38. When a positive going pulse is applied to the charging circuit 2 over the same circuit, the emitter 31 becomes reversed biased and diode 39 forward biased. This permits capacitor 37 to discharge, through diode 39 into capacitor 38, the voltage thereat rises by an increment $$\frac{37}{38}(e)$$

where $e$ is the voltage amplitude of the input pulse from collector 8 of multivibrator 1, since transistor 29 and diode 39 are now non-conducting and conducting respectively. The voltage across 38

$$(\text{old voltage} + \frac{37}{38}(e))$$

is now the new reference voltage with respect to the base of the transistor 29. On the next negative going pulse applied to the charging circuit 2, the upper plate of capacitor 37 charges to the voltage on the upper plate of capacitor 38, which has been increased from the old voltage by the increment $$\frac{37}{38}(e)$$

and the bottom plate of capacitor 37 charges to —E. On the next positive going pulse applied to the charging circuit 2 the voltage on capacitor 38 will be further increased by an amount $$\frac{37}{38}(e)$$

as described above and will serve as a new reference point for base 32 of transistor 29. This incremental build-up of the voltage on capacitor 38 continues until the point of reference 66 is at ground potential.

At this stage of the operation diode 54, which was non-conducting during the charging of the capacitors 37, 38, becomes conducting due to the ground potentials at the point of reference 66. When diode 54 becomes conducting, transistors 40, 41 of the flip-flop 3, becomes non-conducting and conducting respectively. When transistor 40 becomes non-conducting, the potential at the point of reference 67 falls so that diode 56 conducts so that transistor 30 conducts and in so doing, allows capacitor 38 to discharge through transistor 30 and resistor 55 to —E in preparation for another cycle of operation. Diode 56 protects the base emitter junction of transistor 29 against excesisve reverse-bias potenial.

When transistor 41 conducts, the potential at the point of reference 68 rises which when applied to the base of transistor 6, through resistor 28, causes transistor 6 to become non-conducting thus discontinuing any further input to capacitor 37.

The timing may be started by applying a positive pulse to the base of transistor 41 and the output may be obtained from the collectors of transistors 40, 41.

The operation of the circuit shown in FIG. 2 is the same as that described, heretofore for FIG. 1, except that during the time when transistor 4, of the multivibrator 1, is conducting transistor 57 is cut off thus discontinuing the ground connection from the collector 33 of transistor 29. This decreases the collector leakage current of transistor 29 which, at higher temperatures, with respect to the operation of the charging circuit 2.

Considering FIG. 4, the operation of this circuit is the same as that described for FIG. 2 except that by taking the output of transistor 5 through the networks 63, 64, 65 and diode 66 to base 46 of transistor 41 this transistor will receive a continuous string of turn-off pulses. During this time transistor 40 will be conducting and will have its collector at approximately ground potential and thus holding transistor 30 in the non-conducting state and permitting capacitor 38 to be charged as described for FIGS. 1 and 2. When the potential of capacitor 38 reaches ground diode 54 will become conducting, as already described, and will cause transistor 40 to be turned off, which in turn will cause capacitor 38 to be quickly discharged through transistor 30. The immediately following positive going pulse from collector 11 of transistor 5 will cause transistors 41 and 40 to become non-conducting and conducting respectively and thus beginning another cycle of charging of capacitor 38. This is a continuous process because the multivibrator 1 is running freely since transistor 6 has been removed.

Figure 5:
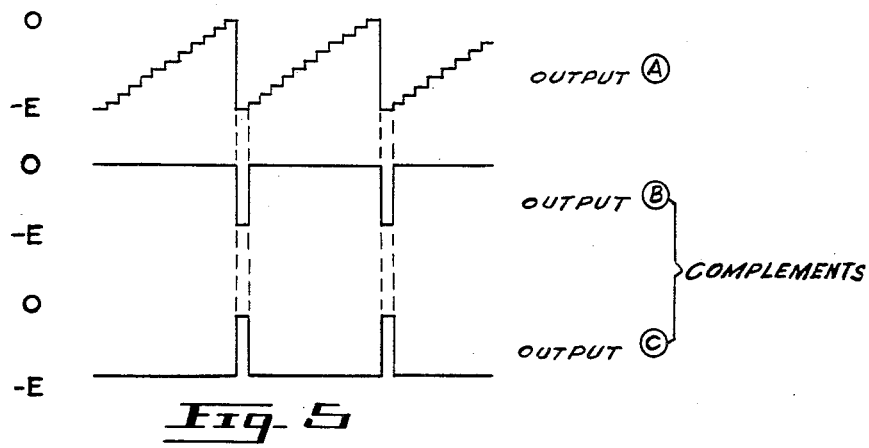
FIG. 5 illustrates the shape of the output pulses derived from the timer circuit shown in FIG. 4.

A high impedance load may be connected across capacitor 38 and the circuit may be used as a stair-case generator as shown in FIG. 5A. Lower impedance loads may be connected to collectors of transistors 40 and 41 where complementary pulses are available as shown in FIG. 5B and FIG. 5C.

Diodes 18 and 19 are employed for the purpose of disconnecting the timing circuits 16, 26 and 17, 27 from the base electrodes of transistors 5 and 4 respectively during the time that these transistors are non-conducting. Diodes 20 and 21 prevent excessive reverse-biasing of base-emitter junctions of transistors 5 and 4 respectively. The base-emitter junction of transistor 6 is not subjected to a reverse-bias hence no precautions are necessary.

What is claimed is:

1. A long interval timing circuit comprising in combination:
  a free-running and a bi-stable transistor multivibrator, each having two states, said multivibrators having first, second, third and fourth transistors of the same conductivity, each having an emitter, collector and base electrode, the emitter electrode of the first, third and fourth transistor being grounded,
  a circuit including a fifth and sixth transistor, the conductivity of the fifth transistor being opposite to the conductivity of the other said transistors, each transistor having an emitter, collector and base electrode; the base electrode of the fifth transistor being connected to the emitter electrode of the sixth transistor, means to ground the collector electrode of the fifth transistor, a first and second capacitor having their first sides connected individually to the emitter electrodes of the fifth and sixth transistor respectively, with the second side of the first capacitor connected to the collector electrode of the first transistor, and the second side of the second capacitor connected to the load potential of the second and third transistors, a first diode connected between the first sides of the capacitors, with the anode and cathode connected to the emitter electrodes of the fifth and sixth transistors respectively, a second diode, poled in the same direction as the first diode, connected to the emitter electrode of the fifth transistor and to the base electrode of the third transistor, a third diode with the anode connected to the base electrode of the sixth transistor and the cathode connected to the collector electrode of the third transistor through a resistor, means for connecting the base electrode of the third and fourth transistor to a source of common potential, a seventh transistor, of the same conductivity as the second transistor, having an emitter, collector and base electrode, with the collector electrode connected to the emitter electrode of the second transistor, the emitter electrode, through a diode with the cathode connected to the emitter electrode of the seventh transistor and the anode to the base electrode of the second transistor, to the base electrode of the second transistor, and the base electrode, through a resistor to the collector electrode of the fourth transistor, means for connecting the collector electrode of the sixth transistor to the load potential.

2. A long interval timing circuit as defined in claim 1, having no ground on the emitter electrode of the fifth transistor, having in combination therewith:

a voltage dividing circuit comprising a first pair of resistors joined together in serial relation connected between the base electrode of the first and second transistors and the second side of the first capacitor, an eighth transistor, of conductivity opposite to that of the fifth transistor, having an emitter, collector and base electrode, with the collector electrode connected to the collector electrode of the fifth transistor, and the base electrode to the junction point of the pair of resistors, means for grounding the emitter electrode of the eighth transistor.

3. A long interval timing circuit comprising in combination:

a free-running and a bi-stable transistor multivibrator each having two states, said multivibrators having first, second, third and fourth transistors of the same conductivity, each having an emitter, collector and base electrode, the emitter electrodes of the first, second, third and fourth electrodes being grounded, a circuit including a fifth and sixth transistor, the conductivity of the fifth transistor being opposite to the conductivity of the other said transistors, each transistor having an emitter, collector and base electrode, the base electrode of the fifth transistor being connected to the emitter electrode of the sixth transistor, a first and second capacitor having their first sides connected individually to the emitter electrodes of the fifth and sixth transistor respectively, with the second side of the first capacitor connected to the collector electrode of the first transistor, and the second side of the second capacitor connected to the load potential of the second and third transistor, a first diode connected between the first sides of the capacitors, with the anode and cathode connected to the emitter electrode of the fifth and sixth transistor respectively, a second diode, poled in the same direction as the first diode, connected to the emitter electrode of the fifth transistor and to the base electrode of the third transistor, a third diode, with the anode connected to the base electrode of the sixth transistor and the cathode connected to the collector electrode of the third transistor through a resistor, a mean for connecting the base electrodes of the third and fourth transistor to a source of common potential, a first pair of resistors joined together in serial relation connected between the source of common potential and the second side of the first capacitor, a seventh transistor, of conductivity opposite to that of the fifth transistor, having an emitter, collector and base electrode, with the collector electrode connected to the collector electrode of the fifth transistor, and the base electrode to the junction point of the pair of resistors, and means for grounding the emitter electrode of the seventh transistor, a means for connecting the collector electrode of the sixth transistor to the load potential, a triggering network connected to emitter-collector output of the fourth transistor.

4. A long interval timing circuit as defined in claim 3 in which said triggering network comprises:

a second pair of resistors, connected in serial relation, connected between the emitter of the fourth transistor and the potential load, a diode having the anode connected to the junction point of the second pair of resistors and the cathode thereof connected to the base electrode of the fourth transistor, a capacitor connected between the junction point of the second pair of resistors and the collector electrode of the second transistor.

5. A long interval timing circuit as defined in claim 4 having in combination therewith:

an output from the first side of the second capacitor so as to form a staircase generator.

6. A long interval timing circuit as defined in claim 4 having in combination therewith:

individual outputs from the collector electrodes of the third and fourth transistors so as to form complementary pulses.

7. In a long interval timing circuit, which includes a source of square wave pulse trains and bi-stable control means, a charging circuit consisting of:

a first and second transistor of opposite conductivity, each having an emitter, collector and base electrode, the base electrode of the first transistor being connected to the emitter electrode of the second transistor, means to ground the collector electrode of the first transistor, a first and second capacitor having the first sides connected individually to the emitter electrode of the first and second transistor respectively, a first diode connected between the first sides of the capacitors, with the anode and cathode connected to the emitter electrodes of the first and second transistors, respectively, a second diode having its anode poled in the same direction as the first diode, so that the anode is connected to the emitter electrode of the first transistor, a third diode having its anode connected to the base electrode of the second transistor, a means for applying the pulse train to the second side of the first capacitor, means for connecting the cathode electrode of the second diode to the bi-stable control means so as to control the conductivity of the states of the bi-stable means, means for connecting the cathode electrode of the third diode to the bi-stable control means so as to control the conductivity of the third diode which in turn controls the discharge of the second capacitor, means for connecting the bi-stable means to disabling means of the source of square wave pulse train upon the discharge of the second capacitor.

References Cited by the Examiner
UNITED STATES PATENTS
3,093,750  6/63  Braner _____ 307—88.5

JOHN W. HUCKERT, *Primary Examiner.*
ARTHUR GAUSS, *Examiner.*